(12) United States Patent
Hamerski et al.

(10) Patent No.: US 6,499,707 B2
(45) Date of Patent: *Dec. 31, 2002

(54) ARTICLE SUPPORT USING STRETCH RELEASING ADHESIVES

(75) Inventors: Michael D. Hamerski, Baldwin, WI (US); James L. Bries, Cottage Grove, MN (US); Alex Rodriquez, Jr., Stillwater, MN (US); Bruce W. Carlson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/790,280

(22) Filed: Feb. 22, 2001

(65) Prior Publication Data

US 2001/0028022 A1 Oct. 11, 2001

Related U.S. Application Data

(62) Division of application No. 08/632,248, filed on Apr. 15, 1996, now abandoned.

(51) Int. Cl.[7] .................................................. A47G 1/17
(52) U.S. Cl. ..................... 248/205.3; 248/683; 248/544
(58) Field of Search ............................... 248/205.3, 467, 248/544, 558, 683, 224.61; 428/343, 40.1, 41.8

(56) References Cited

U.S. PATENT DOCUMENTS

| | | | | |
|---|---|---|---|---|
| 163,531 A | * | 5/1875 | Roake ........................ 248/225 |
| 2,549,766 A | * | 4/1951 | Benson ........................ 248/29 |
| 2,893,676 A | * | 7/1959 | Connors et al. ............. 248/225 |
| 3,387,341 A | * | 6/1968 | Mates et al. .................... 24/73 |
| 3,848,843 A | * | 11/1974 | Levy .......................... 248/224 |
| 4,923,159 A | * | 5/1990 | Wang et al. .............. 248/205.3 |
| 5,269,485 A | * | 12/1993 | Dwinell et al. .......... 248/216.4 |
| 5,409,189 A | * | 4/1995 | Luhmann ................. 248/205.3 |
| 5,507,464 A | * | 4/1996 | Hamerski et al. ........... 248/683 |
| 5,516,581 A | * | 5/1996 | Kreckel et al. .......... 428/317.3 |
| 5,558,307 A | * | 9/1996 | Klein et al. .............. 248/309.1 |
| 5,928,747 A | * | 7/1999 | Luhmann et al. .......... 428/40.1 |
| 6,086,973 A | * | 7/2000 | Hazes ....................... 428/40.1 |

\* cited by examiner

Primary Examiner—Kimberly Wood
(74) Attorney, Agent, or Firm—David B. Patchett

(57) ABSTRACT

An article support adapted for adhering to a substrate is described. The article support preferably includes a base member, a stretch release adhesive tape adhered to that base member, and some mechanism for gripping the stretch release adhesive tape. These items are arranged so that when the base member is adhered to the substrate by the stretch release adhesive tape, the base member can be removed by pulling on the gripping means at an acute angle from the surface of the substrate. Gripping means which resist disassociation from the stretch release adhesive tape during the removal of the base from the substrate are disclosed, including handle types. The base member can be generic, suitable for attaching various types of support members via, for example, complimentary dovetail slides. In such cases, provision such as a latch can be made to temporarily lock the support member to the base member. The article support can be provided so that when the support member is removed from the base member, the gripping mechanism engages the support member to automatically stretch the tape and remove the base member from the substrate.

1 Claim, 5 Drawing Sheets

ARTICLE SUPPORT USING STRETCH RELEASING ADHESIVES

This application is a divisional application of U.S. application Ser. No. 08/632,248, filed Apr. 15, 1996, now abandoned which is hereby incorporated by reference in its entirety.

TECHNICAL FIELD

This invention relates to article supports, and more particularly to article supports adapted to be rapidly adhered and removed from a surface.

BACKGROUND

Hooks and other article supports are commonly used in both households, institutions, and industry for a variety of purposes such as hanging pictures, towels, garments, tools, calendars, posters and other articles. Conventional hooks often require forming holes in cabinets, walls, or the like as fasteners such as screws or nails are used for attaching them. Alternatively, hooks may be adhered by adhesive tapes, but tapes that have strong holding power are typically difficult to remove cleanly from the wall without scraping or otherwise damaging the surface of the wall.

Coassigned and copending U.S. patent application Ser. No. 07/802,061 entitled, "Removable Adhesive Tape", and PCT International Application No. PCT/US91/09472, to Kreckel et al., disclose a stretch releasing adhesive tape. Those documents are herein expressly incorporated by reference.

Those documents disclose an easily removable, pressure-sensitive adhesive tape comprising a highly extensible, substantially non-recovering backing. The tape is capable of being firmly bonded to a substrate and removed therefrom by being stretched at an angle of no greater than about 35 degrees from the surface of the substrate. A problem associated with this type of tape is that some persons find it difficult to grasp for removal. An uncomfortable amount of finger pressure may be required to grip the tape firmly enough to allow removal.

BRIEF DESCRIPTION OF THE INVENTION

The present invention advances the field by providing a very convenient way to adhere, and later cleanly remove, article supports to substrates such as walls, windows and cabinetry. Stated generally, the invention can be described as an article support adapted to adhere to a substrate. The article support includes a base member, a stretch release adhesive tape adhered to that base member, and some means for gripping the stretch release adhesive tape. These items are arranged so that when the base member is adhered to the substrate by the stretch release adhesive tape, the base member is capable of being removed from the substrate by gripping the gripping means and stretching the stretch release adhesive tape at an angle no greater than about 35 degrees from the surface of the substrate. The gripping means preferably resists disassociation from the stretch release adhesive tape during the act of removal. In many practical embodiments, the stretch release adhesive tape will be provided with a layer of release liner to protect the adhesive (e.g. from dirt, dust and other matter which will deleteriously affect the adhesive) until the article support is to be used.

The stretch release adhesive tape will have a backing, and at least one layer of adhesive; most commonly it will have two layers of adhesive. The backing may be a singular layer, or it may be two or more layers laminated together as long as the base member is capable of being removed from the substrate by gripping the gripping means and stretching the stretch release adhesive tape at an angle no greater than about 35 degrees from the surface of the substrate.

In one group of embodiments, the above discussed gripping means is a handle, and the stretch release adhesive tape is adhered to the handle around a surface conformed so as to compress at least a portion of the tape during the removal. While many physical arrangements which achieve this are possible, good results are achieved when the stretch release adhesive tape is wrapped around a portion of said handle in such a manner that the stretch release adhesive tape makes a substantially 180 degree bend. A suitable handle may also have features which make it comfortable to grasp with the fingers; for example, a "D-shaped" ring with the stretch release adhesive tape wrapped around the flat of the "D" shape.

In many of the most convenient embodiments, the base member will be rather generic, suitable for attaching various classes of support member such as hooks, towel racks, picture frame supports, or the like. In these embodiments, the base member will comprise a means for attaching such a support member. Conveniently, such an attaching means may be a pair of complimentary dovetail slides on each of the base member and the support member. Other expedients will suggest themselves to the skilled artisan.

In embodiments which have a means for attaching a support member, it may be convenient to have a means for locking the support member to the base member, either releasably or permanently. Conveniently, a releasable latch may serve as the locking means.

Sometimes it will be convenient to provide an article support such that when the support member is removed from the base member, the gripping means need not be pulled by the fingers, but instead engages the support member as it, for example, slides along a dovetail slide. Then the stretch release adhesive tape is automatically stretched as the support member is pulled so as to remove the base member from the substrate.

As an aid in removal of the stretch release adhesive tape from the substrate, the base member may conveniently have indicia explaining the action involved in removing said base member from the substrate. In those embodiments where the base member has a means for attaching a support member, it may be particularly preferred that such indicia are placed where they are hidden from view when the support member is attached to the base member, but visible when the support member is removed.

In some embodiments of the invention, it may be desirable to have the support member support a substantial amount of weight—more than can be supported by the holding strength of a single base member. This can be accommodated within the definition of the invention by providing a support member that is adapted to engage a plurality of base members that are generally oriented in a single plane simultaneously.

In other embodiments a specialized support member can be provided that is adapted to engage a plurality of base members simultaneously in a way that has the stretch release adhesive tape on the base members oriented in more than one plane. In particular, such a support member can hold two inexpensive, generic base members back-to-back so that e.g. a clock can be adhered to a wall. When desired the stretch release adhesive tape makes it possible to remove the base members cleanly from each substrate, and the object adhered can be taken down temporarily for use or maintenance.

Although for many of the applications which are contemplated for the present invention the base member will be rigid, article supports where the base member is a bendable, but not significantly stretchable film, are also considered within the definition of the invention. Such a construction will be useful for e.g. removable labels.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION

Figure 1:
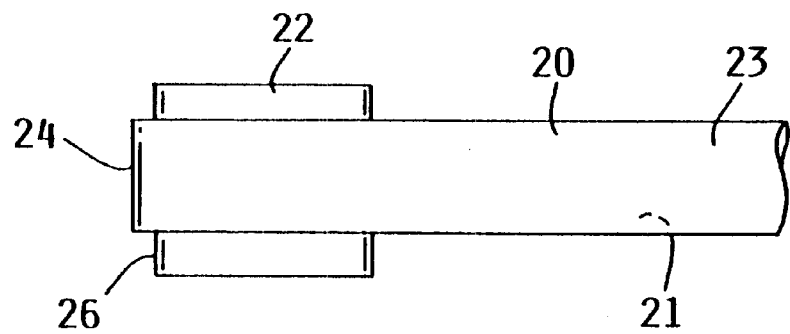
FIG. 1 is a plan view of a length of stretch release adhesive tape adhered to a handle, the handle being one way the gripping means can be embodied.

Referring to FIG. 1, a plan view of a length of stretch release adhesive tape 20 adhered by a layer of pressure sensitive adhesive 21 to a handle 22 is illustrated. The handle 22 serves as a gripping means capable of resisting disassociation from stretch release adhesive tape 20 when the handle is pulled to put the stretch release adhesive tape under a tensile load. Depending on the exact function for which the stretch release adhesive tape 20 is to be used, a second layer of pressure sensitive adhesive 23 will often be present. It will be seen that a portion 24 of the stretch release adhesive tape 20 is adhered to the handle 22 around a surface 26 conformed so as to compress at least a portion of the stretch release adhesive tape during such tensile loading.

Figure 2:
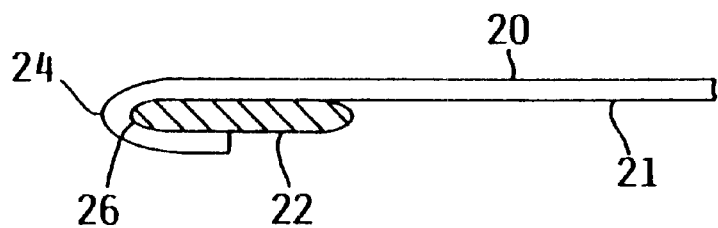
FIG. 2 is a side view of the arrangement shown in FIG. 1.
Figure 3:
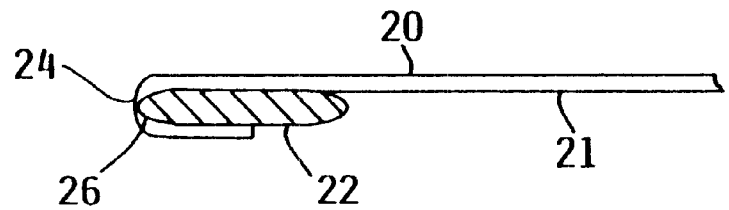
FIG. 3 is the view of FIG. 2, except that the stretch release adhesive tape is shown under a tensile load, so that the compression of a portion of the tape can be depicted.

Referring to FIG. 2, it will be seen that the stretch release adhesive tape 20 is wrapped around the surface 26 of said handle 22 in such a manner that the stretch release adhesive tape makes an angle with respect to itself, so long as the tape 20 does not disassociate from the handle 22. Preferably the angle is substantially 180 degrees. Referring to FIG. 3 the stretch release adhesive tape 20 is shown under a tensile load, so that the compression of portion 24 can be readily visualized.

Figure 4:
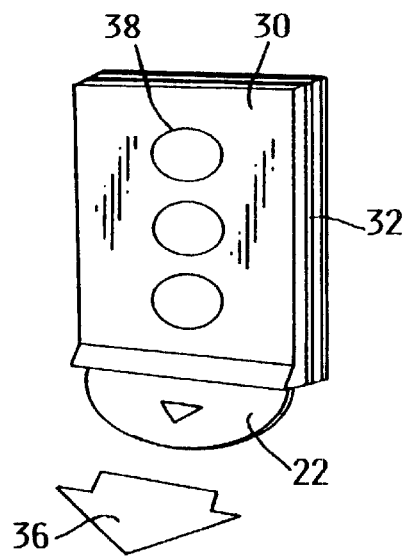
FIG. 4 is a perspective view of a base member provided with a double stick stretch release adhesive tape adhered to a D-shaped handle member used as a means for gripping the tape.
Figure 5:
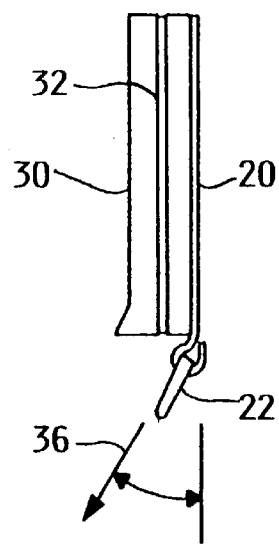
FIG. 5 is a side view of the embodiment of FIG. 4.

Referring now to FIGS. 4 and 5, a perspective view of a base member 30 is illustrated. This base member 30 is provided with a double stick stretch release adhesive tape (adhered to the back and not readily seen in this view). This double stick stretch release adhesive tape also is inserted through and wrapped around an opening of a generally "D-shaped" handle also designated as reference character 22. It will be observed that the tape 20 makes a 180 degree bend back along itself.

The base member 30 depicted here is deliberately intended to be highly generic, suitable for attaching various classes of support member. For this purpose the base member 30 has the male half of a dovetail slide, the two portions of which are designated 32 and 34, so that these slides can serve as a means for attaching such a support member.

A direction arrow 36 shows the direction of pulling on the gripping means 22 which will serve to remove the base member 30 from a substrate. The depicted base member 30 has indicia 38 printed on it to conveniently explain the action involved in removing the base member from the substrate. For example, the indicia may comprise pictographs or icons for indicating that the handle should be pulled approximately directly down to remove the tape 20 (and thus the base 30) from the substrate. In FIG. 5, the dovetail 32 can more readily be seen, and direction arrow 36 is able to more clearly indicate that the stretch release adhesive tape 20 is to be pulled at an angle of no greater than 35 degrees to remove the base member 30 from the substrate.

Figure 6:
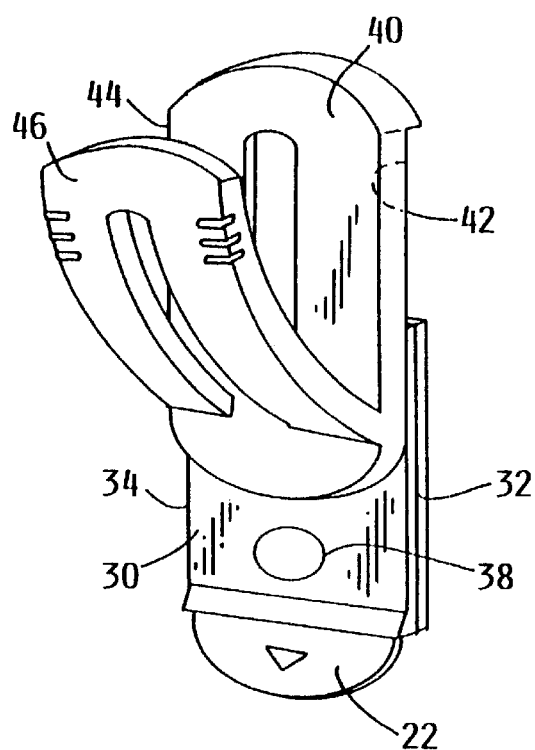
FIG. 6 is a perspective view of an article support according to the present invention showing a support member being attached to a base member.
Figure 6A:
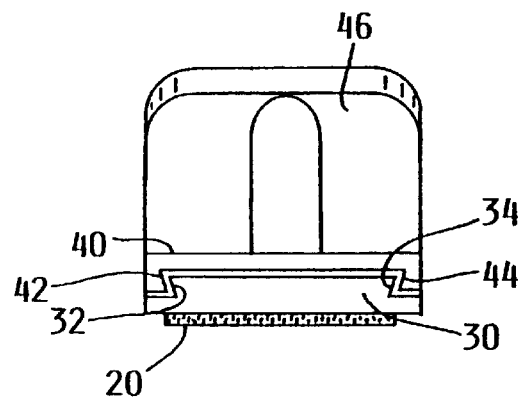
FIG. 6a is a top view of the embodiment of FIG. 6.

Referring to FIG. 6, the base member 30 depicted in FIG. 5 is again shown in perspective view, this time with an article support 40 being attached to the base member using a sliding engagement between the male dovetail slides 32 and 34 on the base member and female dovetail slides 42 and 44 on the support member. The support member 40 is depicted with a rounded hook 46, intending that the representation be considered illustrative of many functionalities which could alternatively be used. Other examples of support members include catches, hook and loop fasteners, eyelets, magnets, corkboard, suction cups, ribs and other such structures. In FIG. 6a, the interaction between the male dovetail slides 32 and 34 on the base member and female dovetail slides 42 and 44 on the support member can more readily be seen.

Figure 7:
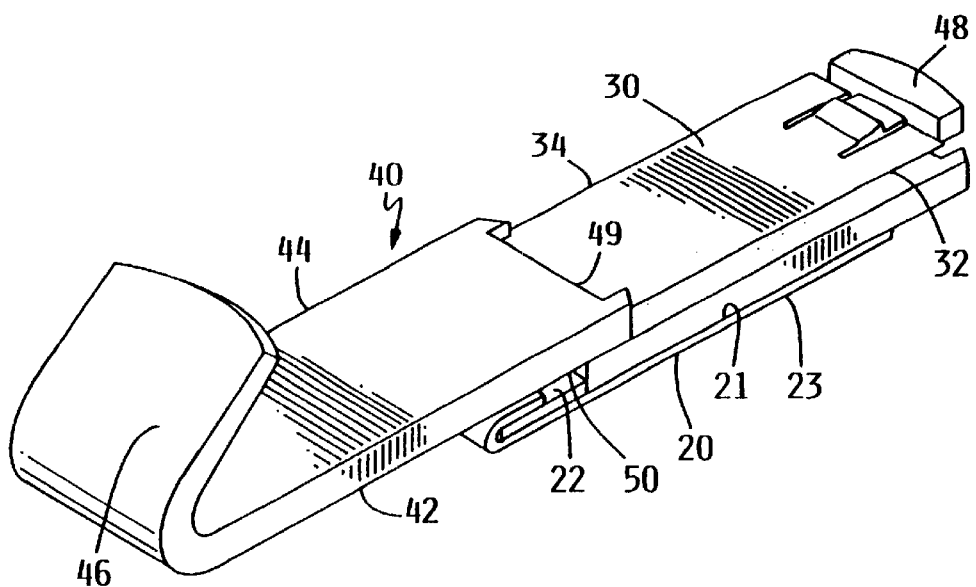
FIG. 7 is a perspective view of an alternate embodiment of the present invention with the support member partially disengaged from its in use position engaging the base member, in which the stretch release adhesive tape is automatically stretched as the support member is pulled so as to remove the base member from the substrate.

Referring to FIG. 7, a perspective view of an alternate embodiment of the present invention in which the stretch release adhesive tape 20 is automatically stretched as the support member 40 is removed from the base member 30, so as to at the same time remove the base member from the substrate. The support member 40 is shown partly slid down the base member 30; in this embodiment, a releasable latch 48 serves as a means for locking the support member to the base member, acting on a recess 49. The base member 30 and the support member 40 are free to slide past each other via the dovetail slides 32, 34, 42, and 44 when the releasable latch is depressed away from recess 49. The handle 22 has just engaged a ledge 50 in this figure, so that the stretch release adhesive tape 20 will be pulled as the support member 40 is disengaged from the base member 30.

Figure 8:
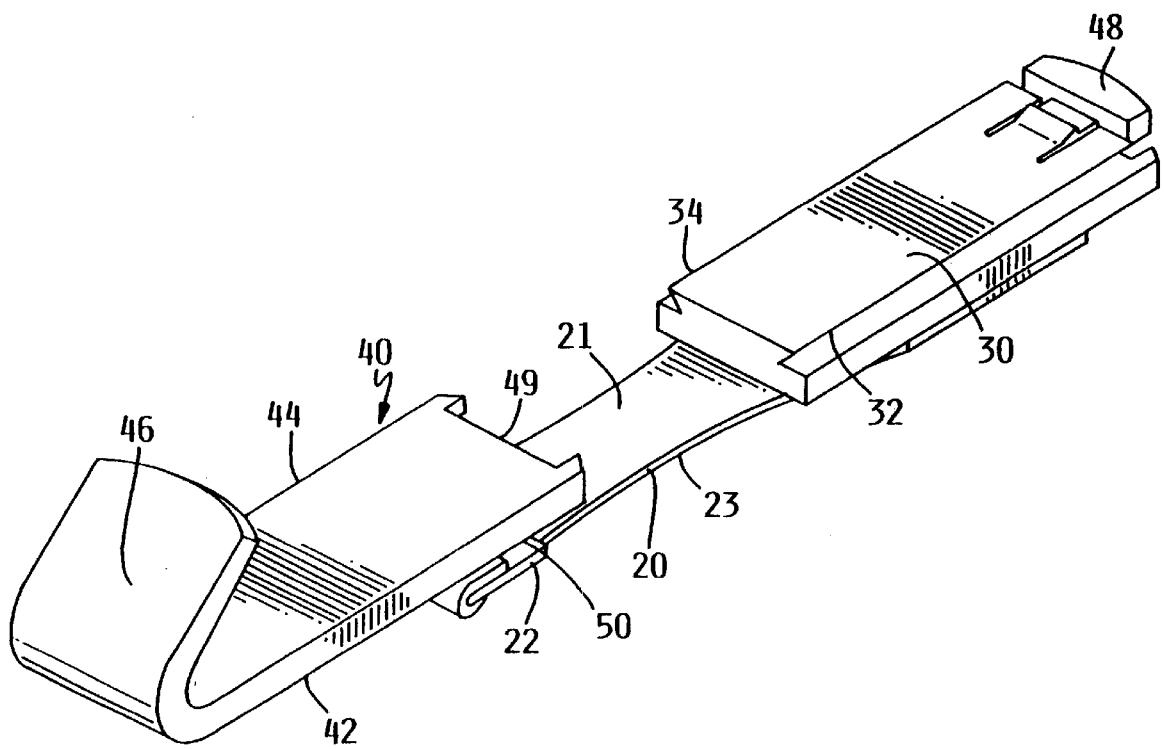
FIG. 8 is the embodiment of FIG. 7 illustrating the support member completely disengaged from the base member, and being used to pull the stretch release adhesive tape.
Figure 9:
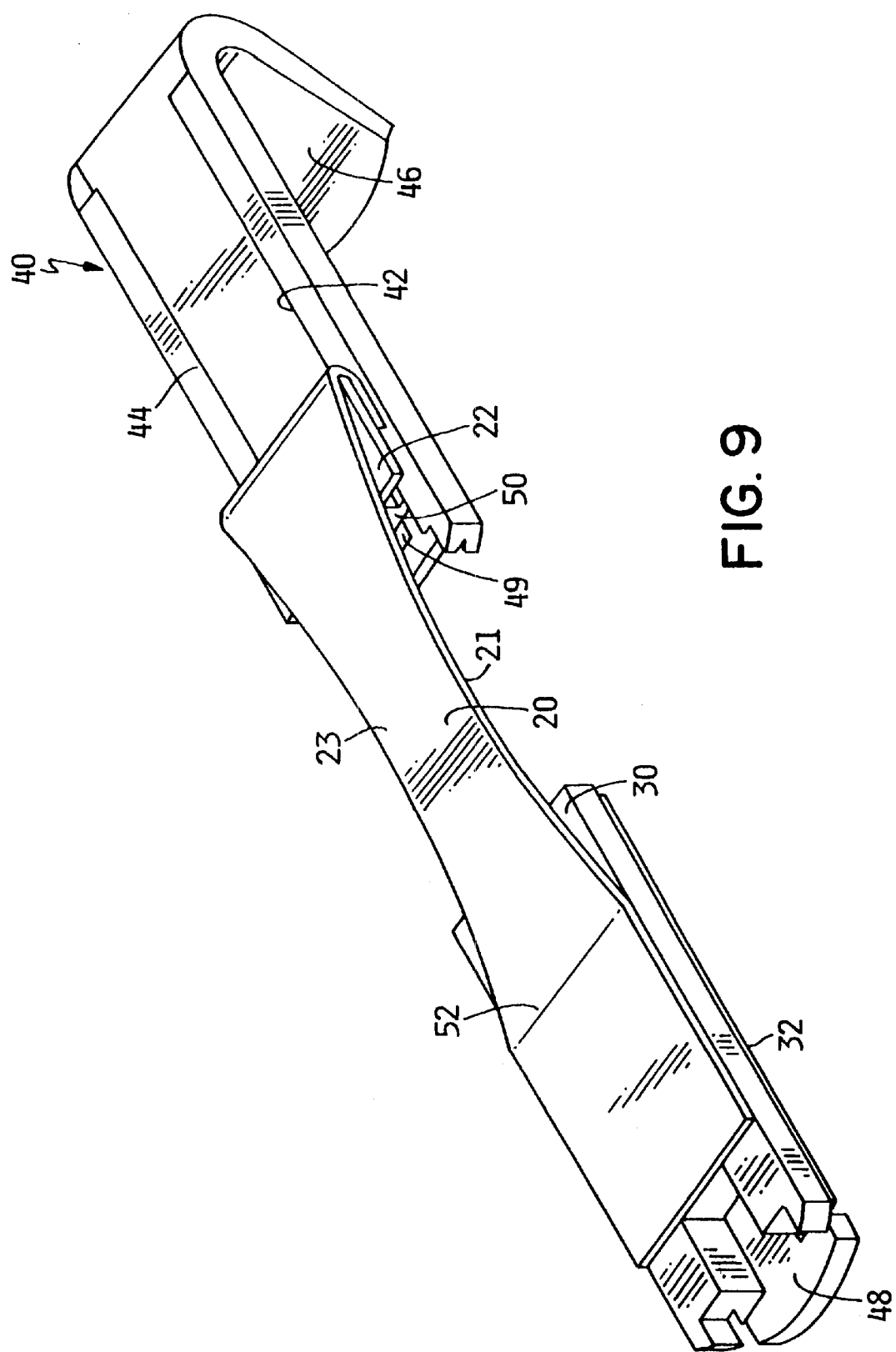
FIG. 9 is the scene of FIG. 8 with the reverse angle shown so as to emphasize the way the stretch release adhesive tape debonds from the base member.

In FIG. 8, the action depicted in FIG. 7 has proceeded, with the support member 40 completely disengaged from the base member 30, and being used to pull the stretch release adhesive tape 20. In FIG. 9, this same scene is shown from the reverse angle, emphasizing the way the stretch release adhesive tape 20 debonds from the base member 30, and similarly from any substrate to which the base member is adhered. Along the debond line 52, the backing of the stretch release adhesive tape 20 is yielding, and this physical action arranges that only a tiny amount of the adhesive layers 21 and 23 are asked to debond at any one time, reducing the chances that the substrate will be damaged by the removal. It will be particularly observed that stretch release adhesive tape 20 is bent around handle 22 forming a substantially 180 degree bend.

Figure 10:
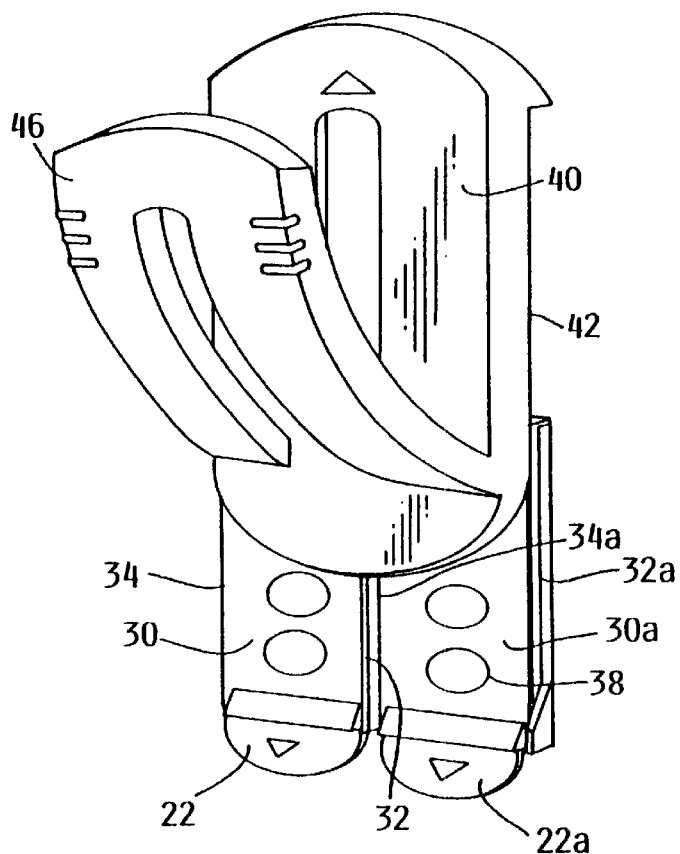
FIG. 10 is a perspective view of an alternate embodiment of the invention in which the support member is adapted to engage a two base members oriented in a single plane simultaneously.

Referring now to FIG. 10 a perspective view of an alternate embodiment of the invention in which the support member 40 is adapted to engage a plurality of base members simultaneously is illustrated. A second base member 30a is depicted, with parts analogous to those of base member 30 showing an "a" suffix. Base members 30 and 30a in this embodiment have simply been adhered side by side, and a wider support member 46 engaged to both of them simultaneously, dovetail slides 32 and 34a becoming superfluous in this arrangement. Other arrangements will readily suggest themselves in the light of this teaching, where two or more base members which are identical for ease of manufacturing and inventorying are set up in a prearranged pattern on the substrate, and a single support member engages all of them simultaneously.

Figure 11:
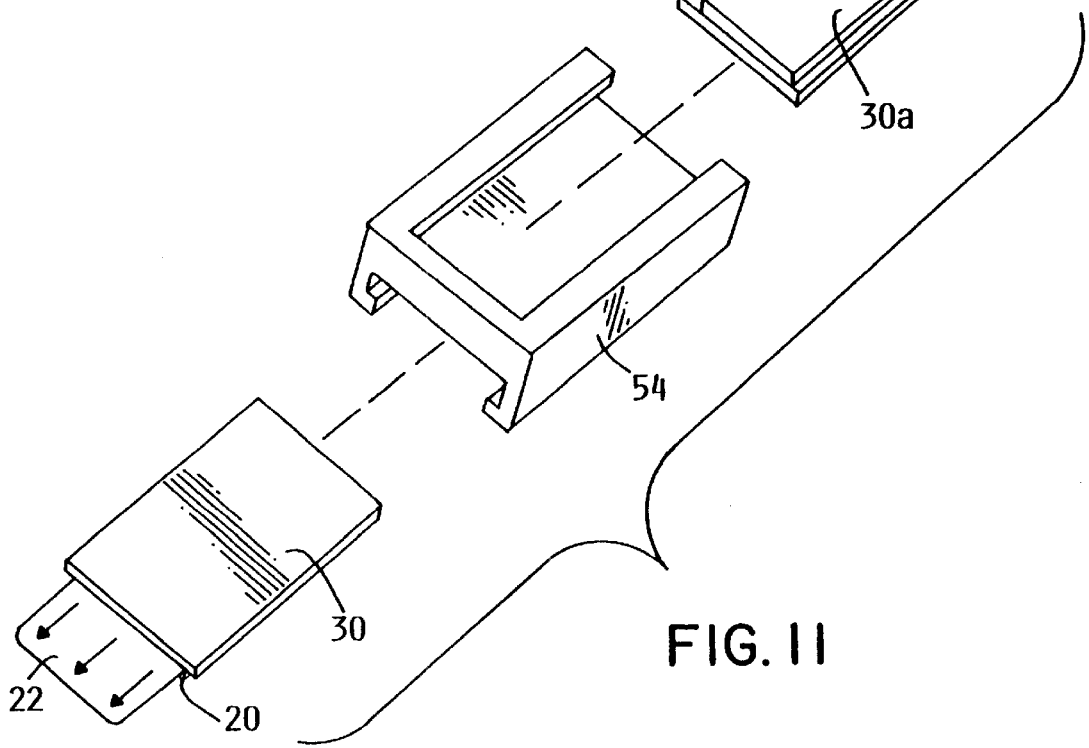
FIG. 11 is an exploded perspective view of an alternate embodiment of the invention in which the support member is adapted to engage two base members so that the stretch release adhesive tape on the two base members are oriented back-to-back.

Referring now to FIG. 11, an exploded perspective view of an alternate embodiment of the invention is illustrated. In this view, a support member 54 is seen which is adapted to engage two similar base members 30 and 30a so that the stretch release adhesive tape 20 and 20a with their gripping means 22 and 22a on the two base members are oriented back-to-back. With the depicted device, an appliance such as a clock can be mounted on a wall, with one base member adhered to the clock and the other base member adhered to the wall. Gravity and physical interference suffice to hold both base members in the specialized support member. However, the clock is easily dismounted for winding or the like by lifting its adhered base member out of the support member. When such mounting is no longer desired the stretch release adhesive tape makes it possible to remove the base members cleanly from both the clock and the wall.

It will be noted that one of the advantages of the present invention is that when a separate base member and support member or used, each can be optimized for its purpose, with different materials and manufacturing methods used. For example, a highly generic base element which will be visually concealed by a decorative support element may be made of materials which balance the properties of low cost and good adhesion to the stretch release adhesive tape. Polyethylene or polypropylene or polystyrene, extruded with a shape possessing an appropriate dovetail cross-section is considered particularly preferred for these applications.

In contrast, the support member need not be optimized for adhesion, and depending on the contemplated use other desirable properties may be selected for such as cost, surface appearance, suitability for accepting decorative plating, bending strength, ability to be readily injection molded, etc.

Depending on the exact application, rigid polyvinyl chloride, high impact polystyrene, or nylon could be advantageously used.

In the interest of a complete presentation, illustrative examples of suitable stretch release adhesive tapes will presented. U.S. Ser. No. 07/802,061 Removable Adhesive Tape to Kreckel, and PCT Application No. PCT/US91/09472 previously incorporated by reference, provide a more complete discussion of alternatives. Additional background on styrene-butadiene block copolymer adhesives which are useful in the context of the present invention can be found in coassigned U.S. Pat. Nos. 4,699,842 and 4,835,217, both to Jorgensen et al., both pressure sensitive adhesives having a broad useful temperature range, both of which are hereby incorporated by reference. Preferred adhesive tapes are disclosed in copending application U.S. Ser. No. 08/114, 500, which was filed on Aug. 31, 1993, and is commonly assigned, incorporated herein by reference.

EXAMPLE 1

An adhesive was made by partially polymerizing 100 g of a blend containing 90% by weight isooctylacrylate monomer and 10% by weight acrylic acid monomer and 0.04 part per hundred 2,2-dimethoxy-2-phenyl acetophenone ("Irgacure 651") to yield a coatable syrup having a viscosity of about 5,000 cps. To this syrup was then added an additional 0.25 g of a blend containing 90% by weight isooctylacrylate monomer and 10% by weight acrylic acid monomer and 0.04 part per hundred 2,2-dimethoxy-2-phenyl acetophenone ("Irgacure 651"), plus 0.125 g of 1,6-hexanediol diacrylate crosslinking agent. The composition was thoroughly mixed and coated onto a silicone-coated polyester film by means of a knife coater adjusted to produce an adhesive thickness of 0.125 mm. After the coated syrup was purged thoroughly with nitrogen gas, it was covered with a second silicone-coated polyester film and polymerized by means of ultraviolet radiation using a total energy of 450 mJ/cm$^2$. One layer of the adhesive was then laminated to each side of a 0.05 mm corona treated linear low density polyethylene film, forming a double-coated adhesive tape. The linear low density polyethylene film, commercially available from Consolidated Thermoplastics Co., had an elastic modulus of 28,968 psi, a 50% modulus of 4,000 psi, a yield stress of 1743 psi, a yield strain of 17.3%, a tensile strength of 7,931 psi, an elongation of 748%, and a recovery of 5.4%.

EXAMPLES 2–6

Adhesive tapes were made generally according to Example 1, but the level of cross-linking agent was varied. Examples were made having crosslinker levels of 0.01, 0.025, 0.05, 0.10 and 0.18 percent. The adhesives so made were discovered to evidence a range of stretch release adhesion properties.

EXAMPLE 7

A styrene-butadiene block copolymer adhesive was knife coated onto a silicone release liner, then dried at 175 degrees F for 15 minutes in a forced air drying oven. Adhesive films of 2.8 mil (0.07 mm) and 4.6 mil (0.14 mm) in thickness were thus made.

While certain embodiments of the present invention have been described in detail herein and as shown in the accompanying Drawings, it will be evident that various further modifications are possible without departing from the scope of the invention.

What is claimed is:

1. An article support adapted to mount an object on a substrate, said article support comprising:
   (a) a support member comprising one of hook and loop fasteners, eyelets, magnets, corkboard, suction cups, and ribs, said support member having opposed first and second surfaces;
   (b) a first base member connected with said support member first surface;
   (c) a first stretch release adhesive tape adhered to said first base member;
   (d) a second base member connected with said support member second surface; and
   (e) a second stretch release adhesive tape adhered to said second base member.

* * * * *